United States Patent [19]
Zalewski

[11] 4,300,290
[45] Nov. 17, 1981

[54] VERTICAL SIGHT ADJUSTER

[76] Inventor: Leon Zalewski, 4 Pleasant St., P.O. Box 119, Warehouse Point, Conn. 06088

[21] Appl. No.: 144,957

[22] Filed: Apr. 29, 1980

Related U.S. Application Data

[63] Continuation-in-part of Ser. No. 1,521, Jan. 9, 1979, abandoned.

[51] Int. Cl.³ .............................................. G01C 15/10
[52] U.S. Cl. ..................................................... 33/392
[58] Field of Search ........................... 33/392, 393, 394

[56] References Cited

U.S. PATENT DOCUMENTS 1,745,027  1/1930  Oxford .................................. 33/392
3,766,659  10/1973  Quenot .................................. 33/392

Primary Examiner—Steven L. Stephan
Attorney, Agent, or Firm—McCormick, Paulding & Huber

[57] ABSTRACT

A device for checking the verticality of a wall includes a square plate with a side length somewhat longer than the diameter of a frusto-conical plumb-bob. A plumb line has one end connected to the plumb-bob, and the other end passed through an opening in the plate so that the user can grasp the excess line in his hand as he holds the plate with his other hand such that it can be tilted relative to the horizontal and/or the line used to raise and lower the plumb-bob as required to check for verticality of the walls surface.

3 Claims, 5 Drawing Figures

VERTICAL SIGHT ADJUSTER

CROSS REFERENCE TO RELATED APPLICATION

This invention is a continuation-in-part of application Ser. No. 1,521, filed Jan. 9, 1979 by the inventor herein and having the same title now abandoned.

BACKGROUND OF THE INVENTION

This invention relates generally to devices for checking the verticality of wall surfaces or the like and deals more particularly with an inexpensive such device having advantages not available in prior art devices of this type.

The 1973 patent to Quenot U.S. Pat. No. 3,766,659 shows a rather complex device of this type, and the upper part or casing is adapted to house the plumb-bob when the device is not in use, and such casing provides for the positioning of said casing against the wall during use.

The usefulness of the Quenot device is limited precisely because of the inherent design limitation as to this single possible position for the casing. When the Quenot device is so used it cannot have the tilting capability possible with the herein device disclosed, particularly as to the capability for determining how far the wall departs from the vertical.

An object of the present invention is to provide a device for checking the verticality of surfaces such that the foregoing disadvantages are not encountered, and so that one may more readily check a wall for verticality than has been possible heretofore.

SUMMARY OF THE INVENTION

According to the invention, a device for checking the verticality of the wall surface perferably includes a plumb-bob which may have a generally frusto-conical configuration and define an axial opening extending through it, a plumb line knotted so as to be received in said plumb-bob opening and to support the plumb-bob on such line, and a rectangular plate with a central hole slidably receiving the plumb line and such that the plate has at least one pair of opposed sides which are parallel, and which parallel sides are slightly longer than the maximum outside diameter of the plumb-bob whereby the said plate can be held with one of the sides against the wall and with the plumb-bob hung therefrom with the result that the plate can be pivotally moved to check for clearance between such wall surface and the plumb-bob itself. At some predetermined angle, preferably on the order of thirty degrees but no greater than an angle of forty-five degrees, the plumb-line will support the plumb-bob in such a way that the latter just touches the wall when the wall is vertical.

DETAILED DESCRIPTION

Figure 1:
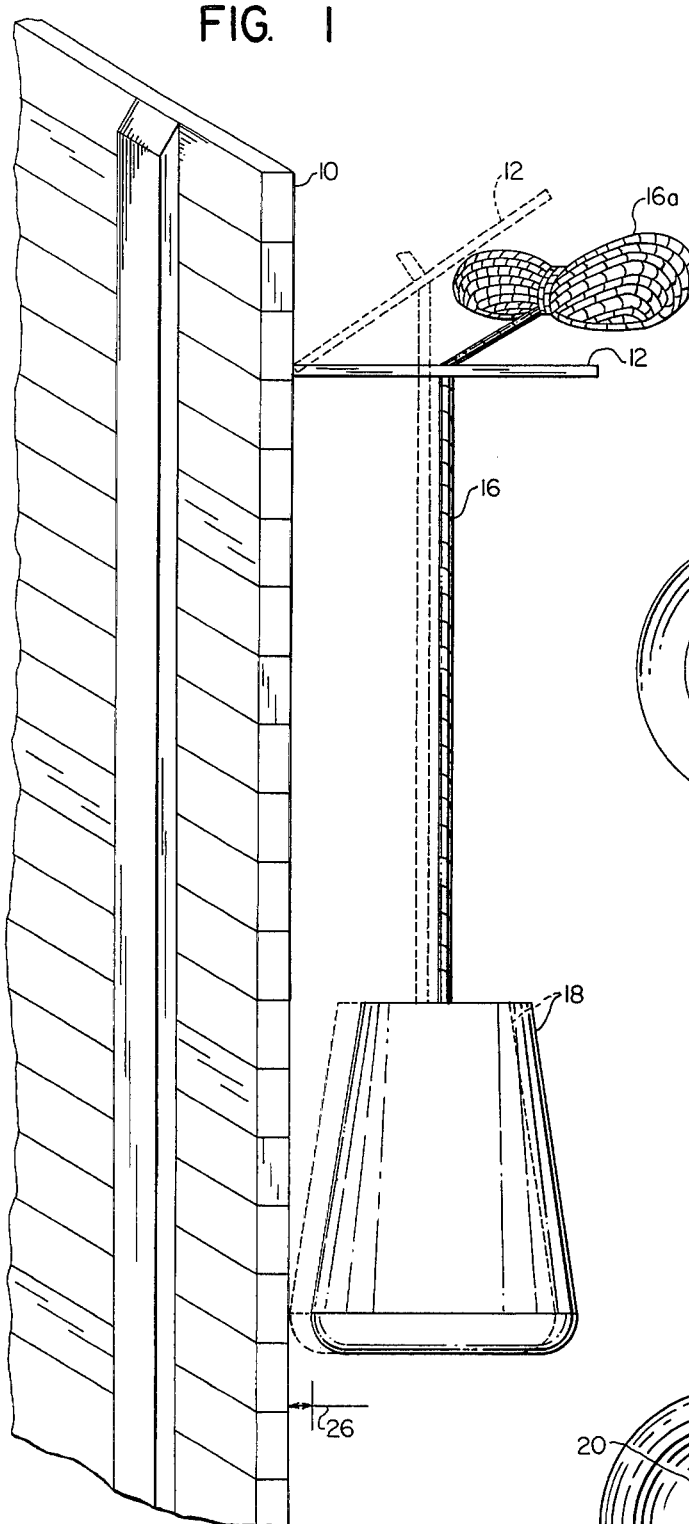
FIG. 1 is an elevational view of a device incorporating the present invention and shows the plate in alternative positions to illustrate in solid lines the preliminary position for the device and in broken lines an alternative position to positively check for verticality of the wall.

Turning now to the drawing in greater detail, FIG. 1 shows a wall 10 to be checked for verticality by a device of the present invention illustrated in alternative positions to be described in greater detail hereinbelow.

Figure 4:
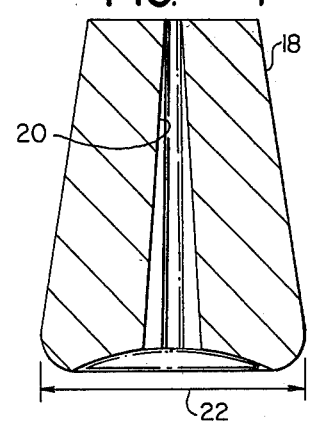
FIG. 4 is a vertical sectional view taken on the line 4—4 of FIG. 3.
Figure 5:
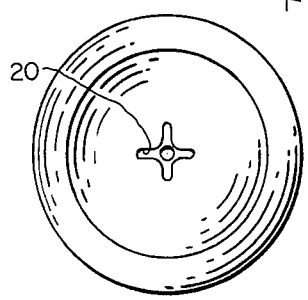
FIG. 5 is a bottom view of the plumb-bob.

The device of FIG. 1 includes a generally square plate 12 having a central opening 14 so as to slidably receive a plumb line 16. A plumb-bob 18 is provided at the lower end of plumb line 16 and the end of plumb line 16 is preferably knotted such that the plumb-bob 18 is secured by reason of the knotted line being passed upwardly through a central opening 20 provided for this purpose in the plumb-bob. FIG. 4 shows the plumb-bob 18 as comprising a generally frusto-conical shape with the central opening which is tapered from a minimum diameter as its upper end to a maximum size at its lower end. Furthermore, this opening 20 has a generally star-shape at its lower end as best shown in FIG. 5 in order to facilitate use of the device, and also to facilitate the manufacture of the plumb-bob itself.

Figure 2:
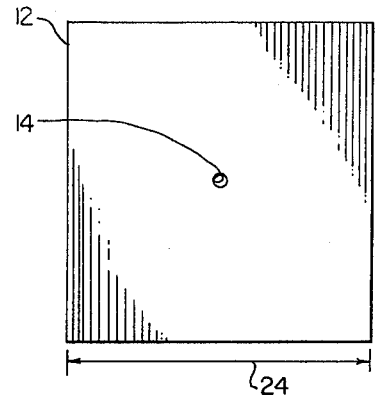
FIG. 2 is a plan view of the plate shown in FIG. 1.
Figure 3:
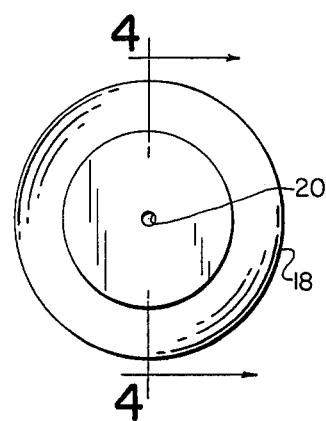
FIG. 3 is a plan view of the plumb-bob.

The plumb-bob 18 has a tapered configuration, with a maximum diameter adjacent its lower end, as shown at FIG. 1. The diameter 22 of this lower portion of the plumb-bob 18 is illustrated in FIG. 4 and it is an important feature of the present invention that this dimension of the plumb-bob is slightly less than the length 24 of one side of the generally square plate 12 illustrated in FIG. 2. As so constructed and arranged the device can be used as shown by the solid lines in FIG. 1 with the result that the plumb-bob 18 hangs on the line 16 close to but not quite touching the wall 10 when the wall itself is vertical. The spacing 26 between the plumb-bob 18 and the wall 10 is determined by one-half the difference between the diameter 22 of the plumb-bob 18 and the length 24 of one side of the square 12. This geometry provides a convenient means for visually checking the verticality of the wall 10 particularly as the ball of string 16a is drawn upwardly through the opening 14 of the plate 12 or dropped downwardly with respect to the plate 12 in order to check the wall 10 for portions which may not be truly vertical. For an accurate indication of the verticality of the wall 10 one simply need tilt the plate 12 to the broken line position shown in FIG. 1 with the result that upon reaching the approximate angle shown (that is between thirty and fourty-five degrees) plumb-bob 18 will actually touch the wall 10 as shown by the broken line position for the plumb-bob 18 in this view.

Since any wall surface to be checked for verticality may well be out of line with the vertical, that is either tilted toward the user of the device or away from him, one can expect to encounter situations where the geometry described above will be of particular advantage over that shown and described in the Quenot prior art reference. For example, if the wall tilts away from the user of the device in FIG. 1 this will immediately become apparent upon his preliminary positioning of the device in the solid line position shown for it. The plumb-bob 18 will be too close or actually touching the wall 10 in such a situation and the user of the device need go no further to realize that he has a wall which is truly not vertical. On the other hand, with the wall tilting toward the user of the device it will of course be immediately apparent to him that holding the device 12 in either of the position shown for it in FIG. 1 will result in too large a space between the plumb-bob 18 and the wall, indicating that the wall is out of true vertical in the opposite direction. It is in the first above described condition where the advantages of the present invention can particularly be realized over and above that of the prior art particularly as disclosed Quenot.

If desired, the other opposed sides of the plate 12 may be made to have a length equal to the diameter of the plumb-bob so that one can use the device in the conventional fashion taught by Quenot and still have the capability of using the device as disclosed herein.

I claim:

1. A device for checking the verticality of a wall or the like, and comprising a plumb-bob having a generally frusto-conical configuration and defining an axial opening extending through the plumb-bob from its upper end to the lower end thereof, a plumb line received in said opening and knotted plate with a central hole for slidably receiving said plumb line, said plate having at least one pair of opposite sides which are parallel and each of which plate sides are slightly longer than the maximum outside diameter of said plumb-bob whereby said plate can be held with one of it's sides against the wall and with the plumb-bob hung therefrom so that the plate can be pivotally moved out of the horizontal to check for clearance between the plumb-bob and the wall, said plumb-bob diameter and said plate side length being so related that the plumb-bob will just touch a vertical wall when the plate is held at an angle in the range between 30–45 degrees relative to the horizontal.

2. The device of claim 1 wherein said plate has its other pair of opposite sides parallel and of equal length, said plumb-bob outside diameter having the same dimension as that of said other pair of sides.

3. The device of claim 1 wherein said axial opening of said plumb-bob has a tapered cross sectional size which is smaller at its circular upper end and larger at its lower star shaped end.

* * * * *